United States Patent [19]

Pierron

[11] E Re. 30,520

[45] Reissued Feb. 17, 1981

[54] METHOD OF MANUFACTURING JACKETS AND LIKE GARMENTS

[76] Inventor: Claude R. Pierron, 7 Rue Albert 1 er, Epinal, Vosges, France

[21] Appl. No.: 360,425

[22] Filed: May 15, 1973

Related U.S. Patent Documents

Reissue of:

[64] Patent No.: 5,004,795
Issued: Mar. 17, 1970
Appl. No.: 778,984
Filed: Nov. 26, 1968

[30] Foreign Application Priority Data

Nov. 27, 1967 [FR] France ..... 67.129867

[51] Int. Cl.[2] ..... B32B 31/00; A41D 27/00
[52] U.S. Cl. ..... 156/250; 2/243 R
[58] Field of Search ..... 156/250, 290, 291, 267; 2/243

[56] References Cited

U.S. PATENT DOCUMENTS

| | | | |
|---|---|---|---|
| 2,993,528 | 7/1961 | Plant | 2/243 |
| 3,129,432 | 4/1964 | Belkino | 2/243 |
| 3,146,465 | 9/1964 | Hummel | 2/49 |
| 3,221,341 | 12/1965 | Hummel | 2/49 |
| 3,435,461 | 4/1969 | Artzt | 2/243 |
| 3,490,077 | 1/1970 | Brown | 2/243 |

*Primary Examiner*—Douglas J. Drummond
*Attorney, Agent, or Firm*—Kenyon & Kenyon

[57] ABSTRACT

A method of continuously manufacturing jackets, in series in an assembly line, from a web, consisting in making pairs of right and left sleeves and laying them flat in a longitudinal row on said web, superposing thereon over said sleeves two bands laterally secured to the edges of said web, respectively, and covering each a different row of sleeves, to form the left and right front sides of the jackets, assembling said bands and web to the outer periphery of the sleeve arm-opening lines and severing the finished jackets.

39 Claims, 18 Drawing Figures

F
1
2
4g
3
2g
4g
5g
6g
7g
8g
5g
4d
2d
4d
5d
6d
7d
8d
5d
I
II
III
IV
V
VI
VII

F
1
6g
6d
7g
7d
9g
9d
1g
1d
10
11g
11d
12g
12d
VII
VIII
IX
X
XI
XII
XIII 114g
1g
111g
111d
114d
(KH)g
(KH)d
109g
1
109d 115g
1g
12'g
12'd
1d
115g
112g
112d
116g
109g
1
109d
116d 1g
110g
109g
108g
109d
1d
6g
116g
1
108d
110d
116d
6d

113
K
L
117
1
L
K
114g
114d
XIV
H
111g
111d
H
XIV
XIII
XIII
12'g
12'd
112g
112d
115g
115d
G
G
110g
110d
XII
XII
116g
109g
116d
108g
1g
1d
109d
108d
6g
6d 1g
114g
111g
12'g
12'd
111d
1d
109g
1
109d
114d 1g
109g
108g
109d
1d
118g
118d
108d
6g
1
6d 1g
110g
109g
108g
109d
110d
1d
6g
5g
108d
1
5d
6d

114g
L
1
117
L
114d
XVIII
XVIII
H
111g
111d
H
12'g
12'd
118g
118d
XVII
XVII
G
G
5d
5g
6d
6g
XVI
XVI
110g
110d
1g
109g
109d
108d
108g
1d

METHOD OF MANUFACTURING JACKETS AND LIKE GARMENTS

Matter enclosed in heavy brackets [ ] appears in the original patent but forms no part of this reissue specification; matter printed in italics indicates the additions made by reissue.

The present invention relates essentially to a method of manufacturing jackets or like garments or wearing apparel such as lounge-jackets, smocks, coats, overalls, shirts, blouses, ladies' dresses or frocks, lumber-jackets, morning coats, waistcoats, overcoats, great-coats, etc . . manufactured from any type of supple and foldable sheet material such as woven or knitted fabric, stuff, paper or the like, made, for instance, from natural textiles or artificial textiles (plastics and like synthetic substances), the method as a whole or the sequence of operations thereof being preferably adapted to be mechanized or line or assembly line for the purpose of mass-production from, advantageously, several webs of material, the separation or severing of the various garments being performed in the last stages of the process, that is to say at the end of the assembly line.

By jackets and similar garments are meant generally all kinds of garments having sleeves of various lengths.

In the following description, the term "assembling" should be understood as implying sewing, for instance by stitching or overcasting, welding such as heat-welding, sticking, heat-sticking, bordering or edging, clamping, riveting, etc. . . . , all of these assembling methods being suitable for use within the scope of the present invention.

It is a well known fact that the industrialisation of garment make-up gives rise to many problems, owing notably to the fact that pure and simple application of traditional basting and assembling techniques prove to be inapplicable where a completely automated, continuous make-up method is to be obtained.

The aim and object of the present invention is to provide a novel method of making up jackets and like articles, essentially with a view to inexpensive and rational manufacturing thereof, capable of being carried out in a continuous manner owing to essential modifications of the very structure of the garments, so as to enable the manufacturing operations to be accomplished continuously on high-efficiency machines.

According to the invention, this problem is solved by means of a method characterized by industrial mass-production along a substantially continuous assembly line formed from at least one initial indefinite web of material whose width is at least equal to the maximum width of the jacket back, and consisting in successively making right and left sleeves respectively and spreading them flat in at least two longitudinal rows of respectively right and left sleeves against and all along the said web, so that the two sleeves of each pair of sleves are substantially symmetrical with respect to a longitudinal axis to be longitudinally superposed on the said web over the said sleeves, at least two elongated layers of material laterally adjoined to the said web respectively along a longitudinal line at least close to one edge of the latter and freely juxtaposed transversely, so as to each cover a different row of sleeves, and intended to form, respectively, the right and left front-sides of the jackets, assembling the two layers and the said web respectively to the outer periphery of the upper end of the sleeves along corresponding arm-hole lines, so as to form a series of jackets whose own longitudinal direction corresponds to the longitudinal direction of the assembly line, and separating or severing the finished jackets from the assembly line by cutting along at least approximately transverse jacket-bottom, neck-opening and shoulder lines, the finished jackets leaving the assembly line in a state folded inside out on the sleeves.

According to another feature of the invention, the said two layers are constituted by two additional separate indefinite webs assembled respectively along the outer longitudinal edge to the opposed edges of the said initial web.

According to a further feature of the invention and a modified embodiment thereof, the width of the said initial web is at least equal to the maximum perimeter of the jacket body and the said two juxtaposed layers are constituted respectively by two opposed longitudinal lateral portions of the said web, the said portions being folded one towards the other on one and the same side of the said web.

According to still another feature of the invention, the sleeves are formed independently in separate units before being placed on the said initial web.

Thus, the sets of sleeves may be discontinuous and the various left and right sleeves in a finished or half-finished or blank state may be successively fit onto the initial web of the jacket body.

However, the sleeves to be assembled to the jacket bodies preferably form parts of a continuous set and, according to a further feature of the invention, all the sleeves of one and the same side are formed into a continuous line by superposing and bilaterally assembling at least two layers of material.

According to still another feature of the invention, the said two superposed layers intended to form the said sleeves of one and the same side are constituted by two superposed indefinite separate webs intended to be superposed to the said initial web and assembled at least along their opposed longitudinal edges, the sleeve blanks being at least approximately aligned in at least a longitudinal row, adjoined to one another and disposed generally in the longitudinal direction of the said webs.

According to another embodiment, the two said superposed layers intended to form the said sleeves of one and the same side belong to a common flattened indefinite tubular sheath intended to be superposed to the initial web and wherein the sleeve blanks are at least approximately aligned in at least one longitudinal row, adjoined to one another and disposed generally in the longitudinal direction of the said tubular sheath.

According to a further embodiment, the said two superposed layers intended to form sleeves of one and the same side belong to a common indefinite auxiliary web whose width corresponds to at least the maximum perimeter of the sleeve and adapted to be longitudinally folded at least approximately in halves, so that the two longitudinal edges thereof are superposed in view of their assembling, the said web being intended to be superposed to the said initial web and the sleeve blanks therein being at least approximately aligned in at least one longitudinal row, while being adjoined to one another and disposed generally in the longitudinal direction of the said auxiliary web.

Advantageously, the assembling of the two superposed longitudinal edges of each auxiliary web is performed along a stepped broken line the longitudinal segments of which are slightly oblique to impart to the respective sleeves the desired flare overspreading from the bottom to the top, the portions in excess lying outside the said line being eliminated by cutting before the main initial web is bilaterally folded.

Preferably, the two substantially symmetrical auxiliary webs are formed from a single web twice as wide and cut into two substantially equal portions along the medial longitudinal axis of the said single web.

On the other hand, with a view to increasing the adaptability of the method and extending the range of its applications, the displacement or feed of the said assembly line is either continuous (or permanent) or intermittent with periodical stops at at least some operating or making stations in a manner known per se. Such an arrangement is advantageous in that it enables to extensively vary the conditions of application of the method and its adaptability to eventually existing plants, sets, systems, machines or apparatus.

Of course, many accessories or fittings may be laid and assembled during the intermediate or final stages of the method according to the invention, in particular inside and outside pockets, sleeve-straps, shoulder-straps, and various fastening means for collars, wrist bands or cuffs, etc.

Likewise, the folding and marking of the laps are preferably performed during a final stage of the method.

The invention also has for its object the novel industrial products, namely jackets and like garments, obtained by the aforementioned method, as well as the machines, systems, apparatus, devices, equipments, sets and plants enabling to carry out the said method and the various applications and uses resulting therefrom.

The invention will be better understood and further objects, characteristics, details and advantages thereof will appear as the following explanatory description proceeds with reference to the accompanying diagrammatic drawings given by way of example only, illustrating several embodiments of the invention and wherein.

Figure 1:
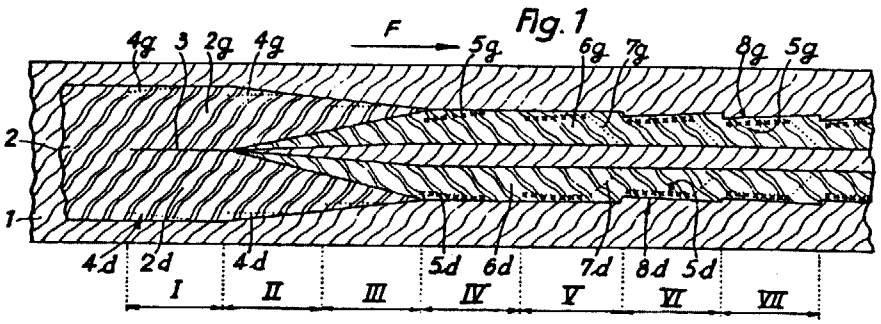
FIGS. 1 and 2 show respectively complementary views illustrating the various operating stages of the method according to the invention.
Figure 2:
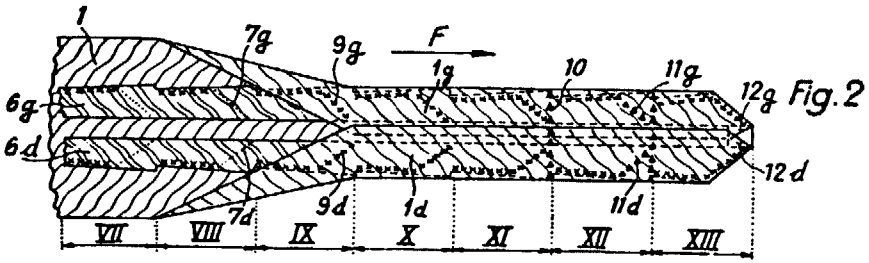

According to the form of embodiment illustrated in complementary FIGS. 1 and 2, the method of the invention may be carried out with a stationary web, but it is preferably carried out by continuously displacing the webs of materials in the direction F through a series of machines successively performing the various making-up stages. The jackets are manufactured from two webs, the sleeves forming part of two continuous sets obtained by folding and assembling. Further, the assembling technique applied during the process consists of adherent sticking following a coating or gluing of the portions to be joined, this being a further feature characterizing the described example of embodiment.

In order to simplify this description and make it applicable to both stationary-web manufacturing and continuous displacement manufacturing, the process has been divided into thirteen elementary stages numbered from I to XIII, the "duration" of each stage corresponding to a displacement of the webs equal to the height of one jacket in the continuous process.

The jackets are manufactured from a web 1 of larger width serving to form the back, the sides and front portions of the jacket, and the web 2 of smaller width serving to form the sleeves. The method will be described stage by stage, with the reserves set forth hereabove and assuming that the webs 1, 2 are initially superposed, although in fact this superposed position occurs only from stage 7 onwards. In FIGS. 1 and 2, the gluing lines are denoted by fine dots, the assembling lines by crosses and the precutting lines by triangles.

Stage I

The sleeve web 2 is centrally divided by a slit 3 into two half-webs 2d, 2g which will subsequently form the right and left sleeves respectively. The half-webs 2d and 2g preliminarly receive glue coatings along two lines 4d, 4g near their outer edge.

Stages II, III, IV

During these stages, the central edge of the webs 2d and 2g is folded towards the outer edge and is assembled thereto along oblique assembling lines 5d, 5g corresponding to the gluing lines 4d, 4g; as will appear more clearly later in this description, the obliquity of these lines corresponds to the conicity or flare of the sleeve. At the end of stage IV, sleeve elements 6d, 6g are obtained.

Stage V

Both faces of the flat-spread sleeve elements 6d, 6g receive preliminary glue coatings along oblique arm-hole lines 7d, 7g.

Stages VI and VII

The sleeve elements are cut along cutting lines 8d, 8g extending outside of the assembling lines 5d, 5g. Then the sleeve webs 2d, 2g are eventually superposed on the initial or main web 1.

Stages VIII, IX, X

The outer edges of the main web 1 are brought towards the center line of the web by folding the latter to form two jacket front elements 1d, 1g in slightly overlapping relationship. The gluing lines 7d, 7g thus become assembling lines 9d and 9g. It should be noted that the assembling of the sleeve elements to the central portion of the web 1 corresponding to the jacket back may alternatively be performed during stage VII.

Stage XI

This stage is an intermediate stage serving, for instance, for the laying of accessory pieces such as pockets, linings, etc.

Stage XII

Each jacket and the sleeves are pre-cut, on the one hand, along a transverse line 10, corresponding to the bottoms of the jacket and the sleeves and, on the other hand, along two pre-cutting lines 11d and 11g extending slightly inside of the assembling lines 9d and 9g. The pre-cutting with a view to subsequently separating or severing the portions to be eliminated or the individual jackets is achieved by slight cutting, incision, perforation or any other similar type of at least partially continuous, slight cuts along lines of diminished resistance forming incipient rupture lines extending along the boundaries of the portions to be eliminated or detached and enabling to sever them by simply tearing them off. This pre-cutting may of course be replaced by a cutting operation.

Stage XIII

The lapels 12g, 12d are marked and folded inwardly.

Figure 3:
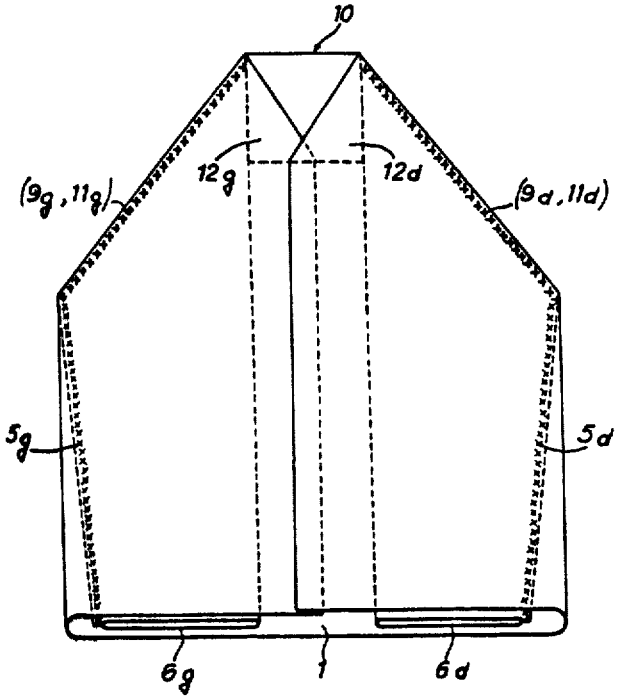
FIG. 3 is a perspective view at a larger scale, illustrating a jacket as it looks at the end of the process according to the invention, that is to say flat-spread and folded inside out.

In order to obtain a jacket there only remains to remove the useless portions lying outside of the pre-cutting lines. A jacket made up by the method of the invention is shown in FIG. 3. It can be seen that the jacket is in a flat-spread condition and turned inside out, this being advantageous in that it ensures the protection of the sleeves and the right face of the garment. In addition, subsequent folding and packing operations are facilitated.

The method of the invention has just been described in thirteen "stages" of equal duration only in order to facilitate the understanding of the invention. In practice, some of the stages may be performed simultaneously or may be inverted, protracted or abridged. At least some of the operations may be carried out according to various sequences. The sets of sleeves just described as being obtained from a single web may also be obtained from two separate webs or two flat-spread tubular assemblies, without exceeding the scope of the invention. Lastly, as already mentioned above, the sleeves in a finished or semi-finished state may be brought directly into the web; they may also be shorter than the jacket.

Figures 4, 5, 6:
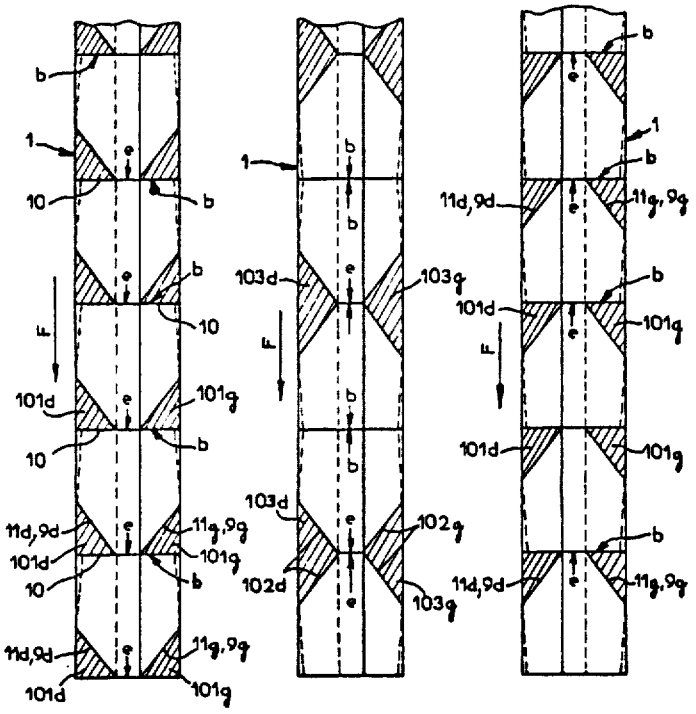
FIG. 4 is a top view of a portion of the jacket assembly line, all the jackets being disposed in the same longitudinal direction and each neck opening being located downstream of the jacket bottom with respect to the direction of displacement of the assembly line.
FIG. 5 is a similar view of an assembly line wherein all the jackets are arranged in the same direction, but wherein the arrangement of the jackets is reversed, the bottom of each jacket being located downstream of its neck opening with respect to the direction of displacement of the assembly line.
FIG. 6 is a similar view of an assembly line differing from the previous ones in that the arrangement of the jackets is alternately reversed from one jacket to the other, so that the successive jackets are alternately adjoined to one another by their neck openings and their bottoms.

FIG. 4 illustrates an assembly line 1 of flat-spread jackets turned inside out and obtained according to the form of embodiment shown in FIGS. 1 and 2, before the severing of the individual jackets. The successive jackets are separated by lines 10 corresponding respectively to the jacket bottoms and by lines 11d, 11g corresponding respectively to the right and left arm-hole lines. The severing of the portions to be eliminated or of the individual jackets is achieved by cutting or by tearing-off the portions at least partially slightly cut beforehand. These slight cutting lines define portions 101d, 101g on the material of web 1, the said portions having (when the web is flat-spread) a substantially triangular shape and comprising at least two superposed layers constituted respectively by the web portion forming the jacket back and by each side of the web folded on its central portion. The neck-opening e of each jacket is located downstream of the jacket bottom b with respect to the direction F of feed, displacement or formation of the assembly line, and is adjoined to the bottom of the next jacket.

In the embodiment illustrated in FIG. 5, the relative arrangement of the jackets is reversed, that is to say the jackets have respectively their bottom b downstream of their neck-opening with respect to the direction of displacement F of the assembly line, this being obtained by modifying the relative arrangement of the oblique arm-opening lines corresponding to the assembling lines 9d, 9g and to the cutting or slight cutting lines 11d, 11g, by reversing the initial arrangement shown in FIG. 1.

According to the embodiment illustrated in FIG. 6, the arm-opening lines are disposed so as to have the jackets arranged according to a recurrent or repetitive pattern of two jackets adjoined by their neck-openings e, the successive pairs of jackets being in turn adjoined to one another by the jacket bottoms b. This final arrangement of the pockets is therefore obtained by simply modifying the relative arrangement of the arm-hole lines and is advantageous in that the material in excess 103d, 103g comprising at least two layers of material and defined by the arm-opening lines 102d, 102g on the outer side thereof, have a surface twice as large as that of the portions 101d, 101g obtained in the form of embodiments illustrated in FIGS. 4 and 5. Owing to this larger surface, the portions in excess are more readily utilized during the severing of the jackets aligned in a row.

Figure 7:
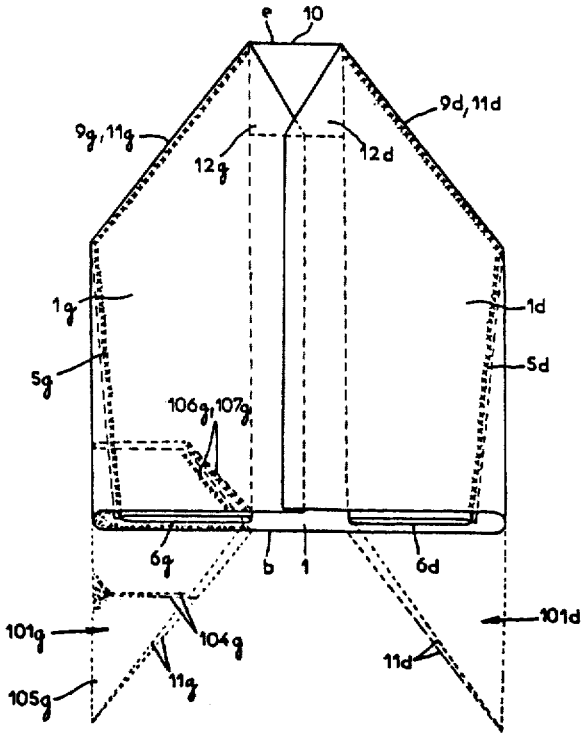
FIG. 7 is a separate view, at a larger scale, of a jacket folded inside out in the finished state, for instance upon leaving the assembly line represented in FIG. 4 or 5, showing how lateral pockets are made by folding the portion of material comprised between the bottom of a jacket and the arm-hole lines of the adjacent jacket.

FIG. 7 illustrates a particularly advantageous way of utilizing or recovering the portions 101g, 101d defined notably in FIGS. 4 and 5, that is to say in case all the jackets in the assembly line are arranged in one and the same longitudinal direction thereof. These portions are no more separated from the jacket bottoms, but remain adjoined to the latter, while still being separated from the arm-opening lines by cuttings performed along the lines 11d, 11g. Once the portions 101g, 101d are preferably cut off along transverse lines such as 104g, 104d substantially parallel with the jacket bottoms, in order to eliminate their lower or tip portion 105g, 106g, they are respectively folded about the transverse jacket-bottom line b to thus form lateral pockets of large dimensions by assembling or fixing (for instance by adherent sticking) these portions folded on the jacket body along lines such as 106g, 107g. In order to obtain external pockets, it is necessary to fold the said portions inwardly, that is to say towards the side of the space comprised between the jacket-back portion 1 and the respectively left, 1g, and right, 1d, front portions of each jacket. On the contrary, by folding the said portions outwardly, internal lateral pockets are obtained.

These pockets may be made for instance during a final manufacturing stage following the thirteen stages already described, the only modification before this additional final stage consisting in that the cutting or slight cutting of the two lateral portions of each line 10 lying outside of the central neck-opening segment e defined by the cutting or slight cutting arm-opening lines 11d, 11g is not performed. Thus, the major part of the material in excess 101g, 101d is directly utilized instead of being purely and simply eliminated. The same recovery and utilization may of course be achieved with the portions 103d, 103g shown in the embodiment illustrated in FIG. 3. In a similar way, the pockets thus formed may be given any shape and dimensions within the limit of the dimensions of portions 101d, 101g or 103d, 103g.

Figure 10:
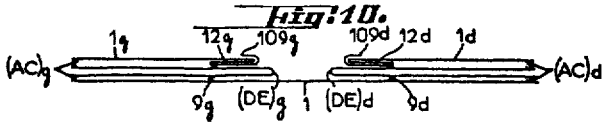
FIG. 10 is a cross-sectional view taken upon the line X—X of FIG. 8.
Figure 9:
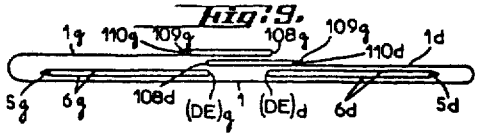
FIG. 9 is a cross-sectional view taken upon the line IX—IX of FIG. 8.
Figure 8:
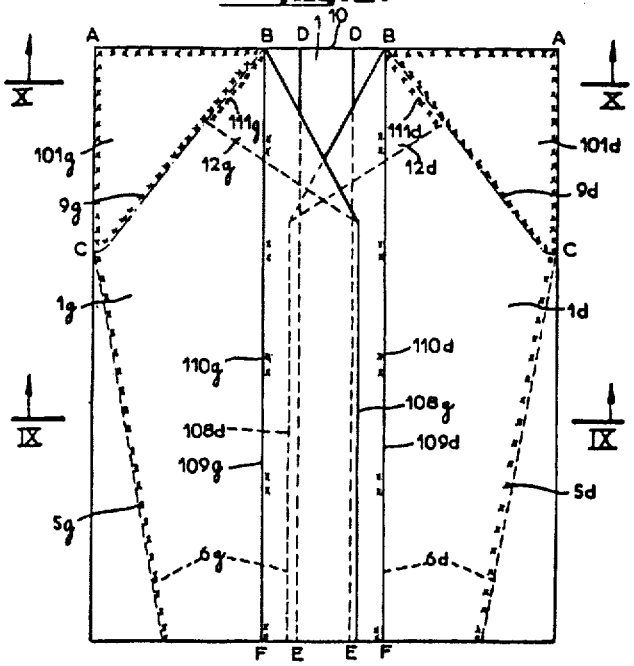
FIG. 8 is a similar view of a separate jacket; showing how the material in excess lying outside the arm-hole lines is recovered and utilized on the spot, and how the arm-holes and the free longitudinal edgings of the front sides are made according to one embodiment of the invention.

FIGS. 8 to 10 show a modified form of embodiment of a jacket obtained by the method of the invention. In this example, the portions of material in excess 101g, 101d having generally the shape of rectangular triangles A B C and adjacent respectively to the oblique rectilinear arm-opening lines 9g, 9d of each jacket are almost completely utilized on the garment, this being advantageous in that it enables to dispense with the special operation consisting in removing or eliminating these portions in the form of scraps of wasted material. Each portion of material 101g, 101d lying outside of the associated arm-opening line is formed of four superposed layers constituted respectively by the corresponding flattened sleeve, the jacket-back portion and one front side of each jacket. These four triangular layers are assembled in two separate pairs along the edge or periphery ABC, and transverse cutting for separating the jackets along the line 10 is eventually completed by a longitudinal cutting along the corresponding edge AC of each triangle ABC outside of the corresponding assembling line. These assembling operations are advantageously performed by sticking along the lines AC and AB glued before the laying of the sleeves, the same preliminary gluing operation being performed on the initial web 1 prior to bilateral folding or superposition of layers.

Efficient protection of the assembling of the sleeves to the jacket body is thus advantageously obtained, in particular when turning the jacket and slipping or pulling the sleeves on, owing to the fact that each triangle ABC is then lodged inside the corresponding sleeve and strengthens the latter in the said zone. Each triangle ABC may also be folded beforehand on the jacket body.

In order to reinforce the assembling zone at the top of each arm-opening, each oblique arm-opening line 9g, 9d partly surrounds the associated sleeve and connects with the transverse neck-opening line 10 at two, respectively back and front, spaced points B located respectively on either side of the adjacent longitudinal shoulder-fold line DE of the associated sleeve and separated by a portion BD of sleeve material.

Further, the free longitudinal edges 108d, 108g of the front, respectively right and left, portions or sides of each jacket are strengthened by being formed of an edging 109d, 109g folded preferably inwardly of the jacket and assembled to the associated front portion or side of the jacket for instance by sticking along a line 110d, 110g after pre-gluing the corresponding portions to be joined. These edgings are folded for instance until each line 109d, 109g substantially registers with the point B adjacent to the neck-opening line 10.

The folded edgings 108d, 108g can also be seen in FIG. 9. Since the said edgings extend up to the top of each jacket, the folded lapels 12d, 12g are formed of a double layer of material, as shown in particular in FIG. 10.

Each jacket lapel 12d, 12g is advantageously assembled to the corresponding front portion or side 1d, 1g at least along its edge 111g, 111d substantially parallel with the adjacent arm-opening line such as BC.

FIGS. 11 to 14 illustrate another form of embodiment of jackets comprising notably the modifications of edgings 108 to 110 of the form of embodiment illustrated in FIGS. 8 to 10. In the form of embodiment of FIGS. 1 to 3, and also in the modifications of FIGS. 8 and 11, the sleeves of each finished jacket folded inside out and flat-spread extend at least approximately in the longitudinal direction and are at least approximately parallel with one another. However, whereas in FIG. 8 a major portion of the arm-opening lines are substantially rectilinear and extend from the transverse neck-opening line to the longitudinal lateral-fold line of the jacket, each sleeve being provided with a substantially straight outer lateral fold line connecting with the transverse neck-opening line, in FIG. 11 the arm-opening lines 112d, 112g are, on the contrary, curved and concave outwardly along the outline GH and extend to the top up to a point H located under the transverse shoulder line 113, while a preferably substantially straight assembling (for instance by sticking) line 114d, 114g connects the top H of the arm-opening lines to a point L at least close to the neck-opening. In addition, contrary to the previous forms of embodiment, each sleeve comprises a rounded or curved convex shoulder portion 115g, 115d and a longitudinal line of junction (for instance by sticking) 116d, 116g of each sleeve is located for instance on the outer lateral side of the sleeve.

The neck-opening is advantageously defined by a cut 117 along the transverse shoulder line 113.

Figures 11, 12, 13, 14:
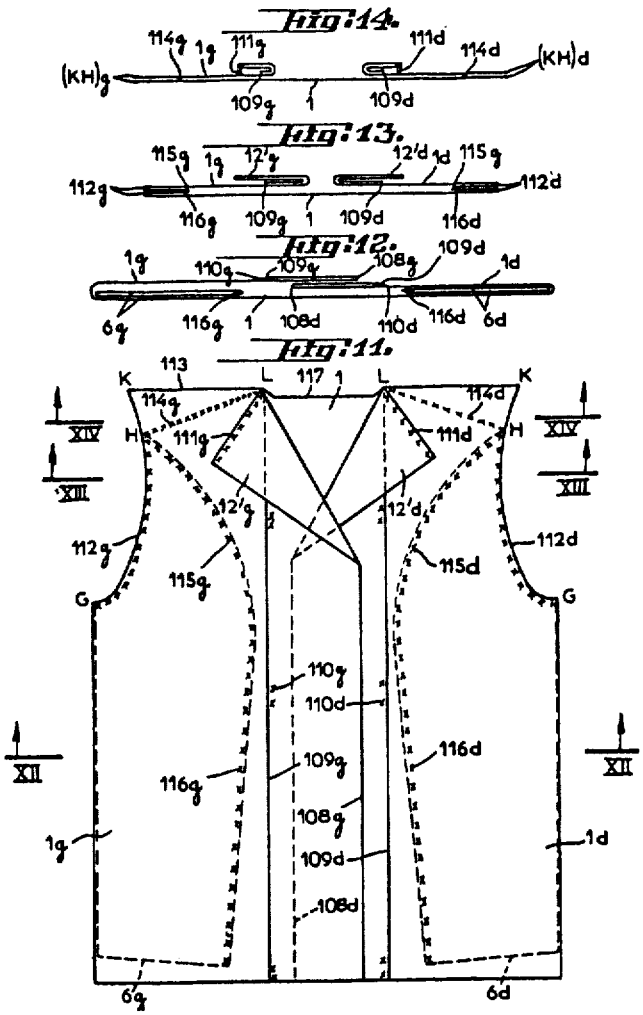
FIG. 11 is a view similar to that of FIG. 8 showing a jacket with sleeves, arm-holes, shoulders and lapels made according to another form of embodiment of the invention.
FIG. 12 is a cross-sectional view taken upon the line XII—XII of FIG. 11.
FIG. 13 is a cross-sectional view taken upon the line XIII—XIII of FIG. 11.
FIG. 14 is a cross-sectional view taken upon the line XIV—XIV of FIG. 11.
Figures 15, 16, 17, 18:
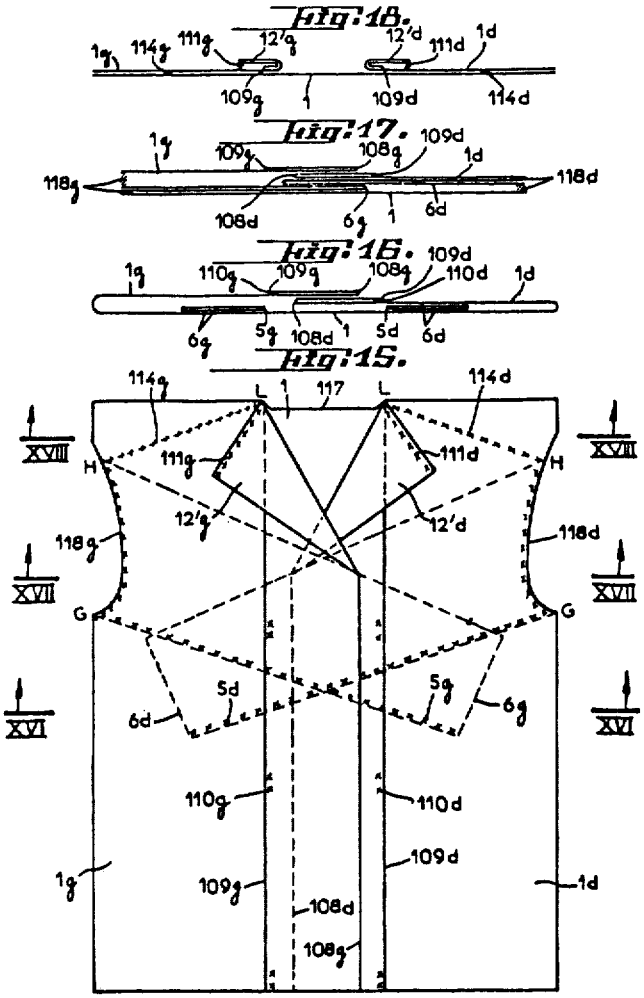
FIG. 15 is a view similar to that of FIG. 11 showing a jacket with arm-holes and relative arrangement of the sleeves according to still another form of embodiment of the invention.
FIG. 16 is a cross-sectional view taken upon the line XVI—XVI of FIG. 15.
FIG. 17 is a cross-sectional view taken upon the line XVII—XVII of FIG. 15.
FIG. 18 is a cross-sectional view taken upon the line XVIII—XVIII of FIG. 15.

Thus, whereas in the previous forms of embodiment the shoulders of the garment were formed directly by the sleeves, in the example of FIG. 11, the shoulders are incorporated in the jacket body and form integral parts thereof and are prolonged by suitably shaped sleeves.

Instead of being folded outwardly, the jacket lapels 12'd, 12'g may be folded inwardly and fixed respectively to the corresponding front portions or sides 1d, 1g, for instance by sticking, at least along their upper free edge 111d, 111g connecting with the neck-opening at a point L.

The form of embodiment illustrated in FIGS. 15 to 18 is similar to that of FIGS. 11 to 14, but differs from the latter by the shape of the arm-opening lines 118d, 118g, the latter being modified in such a manner that on each finished jacket turned inside out and in a flat-spread state the sleeves 6d, 6g are substantially straight and intersect in a substantially symmetrical manner with respect to the medial longitudinal axis of each jacket.

The method according to the invention enables to carry out the doubling or even the tripling of garments such as jackets and, in the specific case of overalls, it is possible to make a longitudinal fold in the middle of the back of each overall, for instance for freedom of movement.

Instead of arranging or aligning the jackets in the assembly line in such a manner that their own longitudinal direction corresponds to the longitudinal direction of the assembly line, the jackets may be arranged so that their own longitudinal direction corresponds to the transverse direction of the assembly line. In this latter case, the successive jackets may be arranged either in one and the same direction or, alternatively, in opposed directions, that is to say head to foot alongside of one another. Further, the series of sleeves of one and the same side may be made generally by superposing and bilaterally assembling at least two layers of material consisting of either two superposed indefinite auxiliary webs to be assembled along at least their opposed longitudinal edges, or by a tubular sheath, the sleeve blanks being at least approximately aligned in a row and arranged in the longitudinal direction and adjoined to one another. In a modified form of embodiment, the sleeve blanks may be arranged parallelly in a transverse direction of the webs or sheaths serving to form them, in which case they may be arranged in one and the same direction or, alternatively, in opposed directions, that is to say head to foot alongside of one another.

One important advantage of the invention consists in that the severing or cutting of each garment is performed only at the end of the manufacturing process or cycle. In addition, the invention is also applicable to the manufacturing of garments with sleeves closing from behind or at the back instead of closing in front as in the forms of embodiment described.

It is to be understood that the invention should not at all be construed as being limited to the forms of embodiment shown and described, as the latter have been given by way of example only.

What is claimed is:

1. A method of manufacturing jackets and garments and like wearing apparel with sleeves of various lengths from any kind of supple sheet material, wherein the improvement consists in an industrial mass production by means of a substantially continuous assembly line formed from at least one indefinite initial web of material the width of which is at least equal to the maximum width of a jacket back and consisting in successively making respectively right and left pairs of sleeves and placing them in a flat-spread condition in at least two longitudinal rows of respectively right and left sleeves against and all along the said web in such a manner that the two sleeves of each pair are substantially symmetrical with respect to a longitudinal axis, longitudinally superposing on the said web over the said sleeves at least two elongated layers of materials laterally adjoined to the said web respectively along a longitudinal line extending at least close to one edge of the web and freely transversely juxtaposed so as to each cover a different row of sleeves and intended to form respectively the left and right front sides of the jackets, assembling the two layers and the said web respectively to the outer periphery of the upper end of the sleeves along corresponding arm-opening lines so as to form a series or sequence of jackets whose own longitudinal direction corresponds to the longitudinal direction of the assembly line, and separating or severing the finished individual jackets of the assembly line by cutting along at least approximately transverse jacket-bottom, neck-opening and shoulder lines, the jackets obtained at the exit of the assembly line being in a state folded inside out on the sleeves.

2. A method according to claim 1, wherein the free longitudinal adjacent edges of the said two layers partially overlap.

3. A method according to claim 1, wherein the said two layers are constituted by two additional separate indefinite webs assembled respectively along their outer longitudinal edge to the opposed edges of the said initial web.

4. A method according to claim 1, wherein the width of the said initial web is at least equal to the maximum perimeter of the jacket body and the said two juxtaposed layers are constituted respectively by two opposed longitudinal lateral portions of the said web, the said portions being folded one towards the other on one and the same side of the said web.

5. A method according to claim 1, wherein the sleeves are made independently in separate units before being placed on the said initial web.

6. A method according to claim 1, wherein all the sleeves of one and the same side are made in a continuous row or line by superposing and bilaterally assembling at least two layers of material.

7. A method according to claim 6, wherein the said two superposed layers intended to form the said sleeve of one and the same side are constituted by two separate superposed indefinite webs intended to be superposed to the said initial web and assembled at least along the opposed longitudinal edges, the sleeve blanks being at least approximately aligned along at least one longitudinal row and being adjoined to one another and arranged generally in the longitudinal direction of the said webs.

8. A method according to claim 6, wherein the said two superposed layers intended to form the said sleeves of one and the same side belong to one and the same indefinite flattened tubular sheath intended to be superposed on the initial web and wherein the sleeve blanks are at least approximately aligned in at least a longitudinal row and adjoined to one another and arranged generally in the longitudinal direction of the said tubular sheaths.

9. A method according to claim 6, wherein the said two superposed layers intended to form the sleeves of one and the same side belong to one and the same indefinite auxiliary web whose width corresponds to at least the maximum perimeter of the sleeve and adapted to be longitudinally folded at least approximately into two halves, so as to superpose and assemble to one another the two longitudinal edges thereof, the said web being intended to be superposed to the said initial web and the sleeve blanks therein being at least approximately aligned in at least one longitudinal row and adjoined to one another and arranged generally in the longitudinal direction of the said auxiliary web.

10. A method according to claim 9, wherein the assembling of the two superposed longitudinal edges of each auxiliary web is performed along a broken stepped line comprising slightly oblique longitudinal segments to impart to the respective sleeves the desired flare or widening from bottom to top, the material in excess lying outside of the said line being illuminated by cutting prior to bilateral folding of the main initial web.

11. A method according to claim 9, wherein the two substantially symmetrical auxiliary webs originate from a single web twice as wide and cuts into two substantially equal portions along the medial longitudinal axis of the said single web.

12. A method according to claim 1, wherein the adjacent longitudinal free edges of the two juxtaposed layers intended to form the front portions or sides of the jackets are folded into a hem and assembled to the said layers along a longitudinal line to form a reinforcing edging.

13. A method according to claim 9, comprising the folding and marking of the lapels of each jacket during a final manufacturing stage.

14. A method according to claim 13, comprising the assembling of each jacket lapel to the associated front portion or side of the jacket along at least its upper free edge connecting with the neck opening.

15. A method according to claim 9, wherein the finished jackets are respectively separated or severed from the said assembly line by cutting, on the one hand, along a transverse jacket-bottom and sleeve-bottom line, and, on the other hand, by cutting along lines respectively substantially parallel with and lying outside of the arm-opening lines.

16. A method according to claim 1, comprising such a relative arrangement of the arm-opening lines on the said auxiliary sleeve webs that at the end of the making-up process, the successive jackets, before being separated from one another, are all arranged longitudinally in one and the same direction, the neck opening of each jacket being adjoined to the bottom of the adjacent jacket.

17. A method according to claim 1, comprising such a relative arrangement of the arm-opening lines on the said auxiliary sleeve-webs that at the end of the making-up process the said successive jackets, before being separated from one another, are arranged alternately in opposed longitudinal directions to as to form successive sets of two adjacent jackets adjoined to one another by their bottom, two adjacent sets being adjoined to one another by the neck openings.

18. A method according to claim 1, wherein the material in excess lying respectively on either outer side of the two arm-opening lines of each jacket is directly utilized at least partially to form lateral pockets by folding at least a portion of the said material in excess on and against the body of each jacket and by assembling it by its lateral edges to the adjacent front portion or side of the jacket.

19. A method according to claim 18, wherein all the said jackets in the said assembly line are arranged in one and the same longitudinal direction of the latter and the portions of material lying respectively between the arm-opening lines of a jacket and the bottom of the adjacent jacket are folded about the transverse bottom line of the latter and assembled thereto to form the said pockets.

20. A method according to claim 19, wherein the said portions of material are cut transversely before being folded against each jacket in order to eliminate their end portion.

21. A method according to claim 9, wherein the at least approximately triangular portion of material in excess lying outside of and adjacent to each arm-opening line of each jacket and formed of four superposed layers of material constituted respectively by the corresponding sleeve, the jacket back and one front portion or side, is not cut off and the said four layers of material are assembled into two separate pairs along their peripherical edge.

22. A method according to claim 21, wherein each said portion of material in excess is preliminarily folded on the body of each said jacket.

23. A method according to claim 1, wherein each jacket front portion or side is assembled to the jacket back along an oblique shoulder line connecting the top of the corresponding arm-opening line to the adjacent end of the neck-opening line.

24. A method according to claim 1, wherein at least some of the abovementioned assembling and fixing operations are performed by adherent sticking subsequent to preliminary gluing of the portions to be assembled.

25. A method according to claim 1, wherein at least some of the said assembling and fixing operations are performed by welding.

26. A method according to claim 1, wherein at least some of the said assembling and fixing operations are performed by sewing.

*27. The method according to claim 24, wherein the said two layers are constituted by two additional separate indefinite webs assembled respectively along their outer longitudinal edge to the opposed edges of the said initial web.*

*28. The method according to claim 27, wherein the sleeves are made independently in separate units before being placed on the said initial web.*

*29. The method according to claim 28 wherein front garment elements selected from the group consisting of pockets, sleeve-straps, shoulder-straps and fasteners are adhered to said two layers.*

*30. The method according to claim 24, wherein the free longitudinal adjacent edges of the said two layers partially overlap.*

*31. The method according to claim 30, wherein the said two layers are constituted by two additional separate indefinite webs assembled respectively along their outer longitudinal edge to the opposed edges of the said initial web.*

*32. The method according to claim 31, wherein the sleeves are made independently in separate units before being placed on the said initial web.*

*33. The method according to claim 32, wherein front garment elements selected from the group consisting of pockets, sleeve-straps, shoulder-straps and fasteners are adhered to said two layers.*

*34. The method according to claim 10, wherein at least some of the above-mentioned assembling and fixing operations are performed by adherent sticking subsequent to preliminary gluing of the portions to be assembled.*

*35. The method according to claim 11, wherein at least some of the above-mentioned assembling and fixing operations are performed by adherent sticking subsequent to preliminary gluing of the portions to be assembled.*

*36. The method according to claim 16, wherein at least some of the above-mentioned assembling and fixing operations are performed by adherent sticking subsequent to preliminary gluing of the portions to be assembled.*

*37. The method according to claim 17, wherein at least some of the above-mentioned assembling and fixing operations are performed by adherent sticking subsequent to preliminary gluing of the portions to be assembled.*

*38. The method according to claim 20, wherein at least some of the above-mentioned assembling and fixing operations are performed by adherent sticking subsequent to preliminary gluing of the portions to be assembled.*

*39. A method of manufacturing jackets and garments and like wearing apparel with sleeves of various lengths*

*from any kind of supple sheet material, wherein the improvement consists in an industrial mass production by means of a substantially continuous assembly line formed from at least one indefinite initial web of material the width of which is at least equal to the maximum width of a jacket back and consisting in successively making respectively right and left pairs of sleeves and placing them in a flat-spread condition in at least two longitudinal rows of respectively right and left sleeves against and all along the said web in such a manner that the two sleeves of each pair are substantially symmetrical with respect to a longitudinal axis, longitudinally superposing on the said web over the said sleeves at least two elongated layers of materials laterally adjoined to the said web respectively along a longitudinal line extending at least close to one edge of the web and freely tranversity juxtaposed so as to each cover a different row of sleeves and intended to form respectively the left and right front sides of the jackets, wherein the said two layers are constituted by two additional separate indefinite webs assembled respectively along their outer longitudinal edge to the opposed edges of the said initial web, and wherein the sleeves are made independently in separate units before being placed on the said initial web, assembling the two layers and the said web respectively to the outer periphery of the upper end of the sleeves along corresponding arm-opening lines so as to form a series or sequence of jackets whose own longitudinal direction corresponds to the longitudinal direction of the assembly line, wherein at least some of the above mentioned assembling and fixing operations are performed by adherent sticking subsequent to preliminary gluing of the portions to be assembled, and separating or severing the finished individual jackets of the assembly line by cutting along at least approximately transverse jacket-bottom, neck-opening and shoulder lines, the jackets obtained at the exit of the assembly line being in a state folded inside out on the sleeves.*

* * * * *

UNITED STATES PATENT AND TRADEMARK OFFICE

CERTIFICATE OF CORRECTION

PATENT NO. : RE 30,520

DATED : February 17, 1981

INVENTOR(S) : Claude Raymond Pierron

It is certified that error appears in the above—identified patent and that said Letters Patent is hereby corrected as shown below:

On The Title Page, item (64), "5,004,795" should read -- 3,500,479 --.

Column 11, line 39, after "directions" change "to" to read -- so --.

Column 13, line 16, "tranversity" should read -- transversity --.

Signed and Sealed this

Ninth Day of June 1981

[SEAL]

Attest:

RENE D. TEGTMEYER

Attesting Officer

Acting Commissioner of Patents and Trademarks

UNITED STATES PATENT AND TRADEMARK OFFICE

CERTIFICATE OF CORRECTION

PATENT NO. : RE 30,520

DATED : February 17, 1981

INVENTOR(S) : Claude Raymond Pierron

It is certified that error appears in the above—identified patent and that said Letters Patent is hereby corrected as shown below:

Column 13, line 16, "tranversity" should read -- transversely --

This certificate suspersedes Certificate of Correction issued June 9, 1981.

Signed and Sealed this

*Twentieth* Day of *October 1981*

[SEAL]

*Attest:*

GERALD J. MOSSINGHOFF

*Attesting Officer*

*Commissioner of Patents and Trademarks*